Dec. 9, 1952     H. H. HURLBERT     2,621,074
SPRAYER AND MOUNTING THEREFOR
Filed Oct. 14, 1950
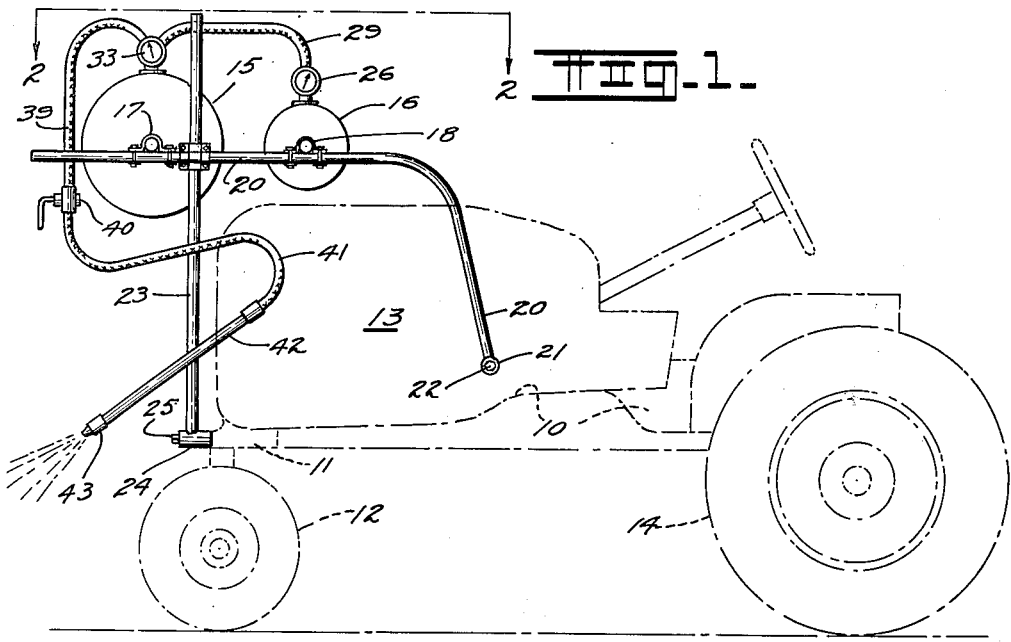
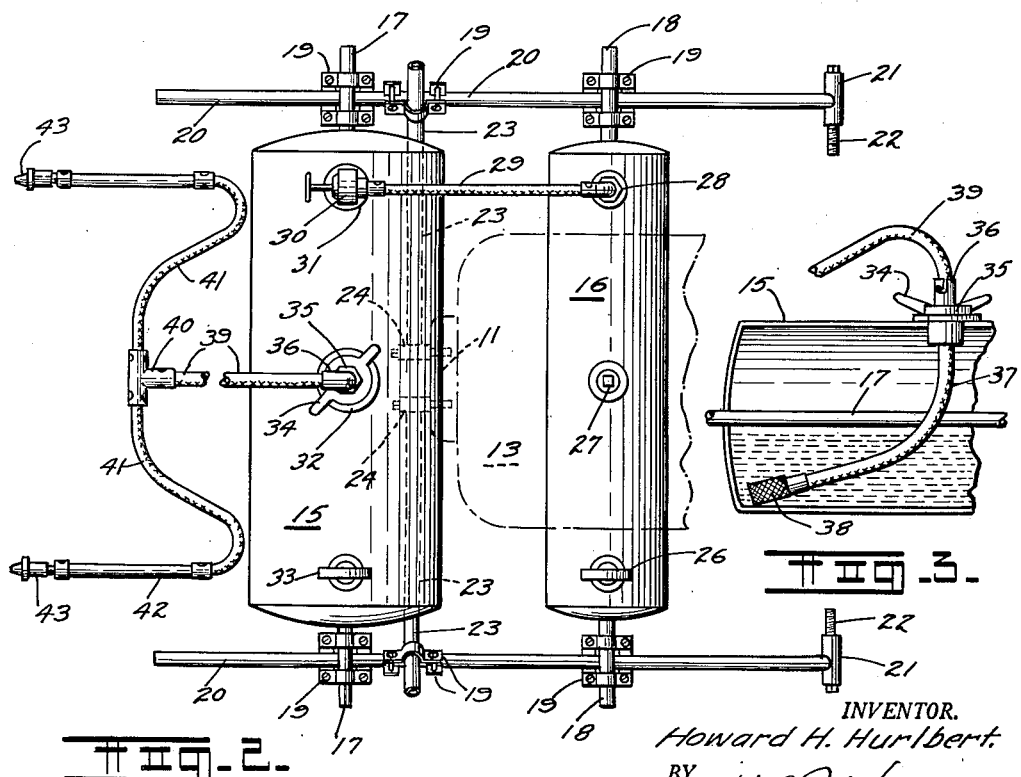
INVENTOR.
Howard H. Hurlbert
BY
W. B. Harpman
ATTORNEY.

Patented Dec. 9, 1952

2,621,074

UNITED STATES PATENT OFFICE 2,621,074

SPRAYER AND MOUNTING THEREFOR

Howard H. Hurlbert, Kinsman, Ohio

Application October 14, 1950, Serial No. 190,190

5 Claims. (Cl. 299—43)

This invention relates to a sprayer and more particularly to a sprayer for use in cultivating and to a mounting for the sprayer whereby the sprayer may be mounted on any desired device capable of transporting it.

The principal object of the invention is the provision of a sprayer and a mounting therefor that is adaptable to any transporting device capable of carrying a sprayer.

A further object of the invention is the provision of a sprayer and mounting therefor of extremely simple and inexpensive construction and which may be readily adapted to any tractor or other transporting device and attached thereto to firmly and efficiently mount the sprayer for use in connection therewith.

A still further object of the invention is the provision of a sprayer and mounting therefor, the sprayer including a non-clogging liquid filter for the material being sprayed.

A still further object of the invention is the provision of a sprayer and a mounting therefor which may be simply constructed, packaged compactly and assembled by an inexperienced user on any suitable transporting device.

The sprayer and mounting therefor disclosed herein comprises a simple and efficient spraying attachment for a conventional farm tractor and the like, and which sprayer, and particularly the mounting thereof, enables it to be mounted on any type of transporting device such as a garden tractor, cultivator or a similar device.

The sprayer and mounting therefor comprises essentially a pair of interconnected tanks, one of which comprises a container for the fluid being sprayed and the other of which comprises an air pressure reservoir. The mounting disclosed herein is adjustably affixed to the tanks and capable of being attached to any transporting device.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side view of the sprayer and mounting shown in position on a farm tractor.

Figure 2 is a top plan view of the sprayer and mounting.

Figure 3 is an enlarged detailed view of a portion of one of the tanks of the sprayer shown in figures 1 and 2 of the drawings.

By referring to the drawings and Figure 1 in particular it will be seen that a farm tractor has been disclosed and that it includes a frame 10 having a foremost portion 11 pivotally mounting front wheels 12. The frame 10 carries a motor and motor housing 13 and has spaced, large rear wheels 14 as is customary in farm tractors. As is also customary in farm tractors, the various parts of the device are secured to one another by bolts and several of these securing bolts are utilized for securing the sprayer and mounting to the tractor.

The sprayer comprises a fluid tank 15, an air supply tank 16, both of which have longitudinally extending shafts 17 and 18 disposed therethrough, the ends of which project as stubs with respect to the ends of the tanks 15 and 16, respectively. Four-part clamps 19 are used to clamp the shafts 17 and 18 to a pair of spaced mounting frames 20 which extend horizontally and longitudinally of the tractor throughout approximately one-half of their length and the rearmost ends of which are bent downwardly as best shown in Figure 1 of the drawings and provided with transversely positioned, tubular T end formations 21—21. A pair of bolts 22 are positioned one through each of the tubular T end formations 21—21 and substitute for a pair of bolts normally found in the tractor assembly, thus securing the rearmost ends of the mounting frame members 20—20 to the tractor.

It will be obvious that the mounting frames 20 may be bent so that the tubular T-shaped end formations 21—21 may be properly aligned with suitable bolts in the tractor and preferably on the tractor frame 10. The mounting frames 20—20 are held in horizontal position by a pair of secondary mounting frames 23—23 which are positioned in approximately vertical position at the front of the tractor. The secondary mounting frames 23—23 are provided with tubular T-shaped end sections 24—24. Bolts 25 positioned through the tubular T-shaped end sections 24 engage the front portion 11 of the tractor and replace a pair of bolts ordinarily found in a tractor assembly. The upper portions of the secondary mounting frames 23 are secured to the mounting frames 20 by additional four-part clamps 19.

By referring to Figures 1 and 2 of the drawings it will be observed that the secondary mounting frames 23—23 form a vertically standing V-shape spaced apart at their uppermost ends and secured to the portion 11 of the tractor at their lowermost ends. A four point connection with the tractor is thus established which adequately supports the tanks 15 and 16.

Still referring to Figures 1 and 2 of the drawings it will be seen that the four-part clamps 19 comprise two pairs of oppositely disposed clamping pieces each of which has an arcuate middle section. One of the pairs of clamping pieces is positioned on one side of the shaft 17, for example, as shown in Figure 2 of the drawings, and the other pair of the clamping pieces is positioned on the opposite side of the mounting frame 20. Bolt and nut assemblies secure the two pairs of clamping pieces to one another at their corners whereby the shaft 17 is firmly attached to the mounting frame 20. These same clamps 19 are used to secure the tank 16 by way of its stub shafts 18 to the mounting frame 20 and to secure the secondary mounting frame members 23 to the mounting frames 20. It will be obvious that the clamps 19 can be positioned at any location along the two pairs of mounting frame members 20 and 23 thereby rendering the sprayer and mounting therefor extremely flexible in assembly as its various parts may be adjusted to conform to the particular tractor to which it is attached.

By referring to Figures 1 and 2 of the drawings it will be seen that the tank 16 is provided with a pressure gauge 26, a valved inlet orifice 27 and an outlet orifice 28. The outlet orifice 28 communicates with a flexible hose 29 which establishes communication with a pressure regulator 30 which in turn communicates with an inlet orifice 31 on the tank 15. The tank 15 is also provided with an outlet orifice 32 and a pressure gauge 33. The outlet orifice 32 is provided with a closure 34 having a portion 35 thereof formed in the manner of half of a quick coupler and adapted to detachably secure a registering quick coupler 36. The quick coupler 36 formed in the closure 34 has a flexible tube 37 attached thereto which extends downwardly into the tank 15 and has a filter 38 located on the free end thereof, the flexible tube 37 being of a length sufficient to permit the filter 38 to roll around in the tank 15 and thus be self-cleaning with respect to sediment, etc.

The quick coupler 36 is provided with a flexible hose 39 which communicates with a T 40 having a pair of flexible hoses 41—41 establishing communication with a pair of nozzle extensions 42—42 which are in turn provided with spray nozzles 43—43 at their outermost ends. The nozzle extensions 42 may be clamped to any desired portion of the tractor or to the secondary mounting frames 23—23 if desired by additional clamps 19 as hereinbefore described. The location of the nozzle extensions 42 and the spray nozzles 43 is thereby made entirely flexible so that they can be located either before, beside or behind the tractor or other transporting device as desired by the user.

It will thus be seen that a simple and efficient cultivating sprayer and mounting has been disclosed which meets the several objects of the invention.

Having thus described my invention, what I claim is:

1. A sprayer and mounting therefor, the sprayer including a pair of tanks having shafts extending therefrom and the mounting comprising two pairs of elongated frame members each of which has a tubular T end formation on at least one of its ends and clamps for securing the shafts of the tanks to at least two of the said frame members in criss-cross relation and the frame members to one another in criss-cross relation to form a supporting framework for said tanks.

2. The sprayer and mounting therefor disclosed in claim 1 and further characterized by the formation of the pairs of mounting frame members as deformable members whereby the same may be bent to desired shape.

3. A sprayer and mounting therefor, the sprayer including at least one tank having shafts extending outwardly therefrom and a plurality of elongated frame members each of which has a tubular end portion formed at right angles thereto and clamps for securing the mounting frame members to one another in criss-cross relation to form a supporting framework and for securing the said shafts of the said tank to the said frame members in criss-cross relation whereby the tank is held by said framework.

4. The sprayer and mounting set forth in claim 3 and further characterized by the formation of the frame members as deformable tubular elements whereby the same may be shaped as desired.

5. A sprayer and mounting therefor, the sprayer comprising a pair of tanks each having shafts extending from the ends thereof, one of the tanks comprising an air pressure reservoir and the other of the tanks comprising a fluid source, means interconnecting the tanks whereby air pressure may be delivered from one to the other, a spray nozzle and means connecting the spray nozzle with the said tank forming the fluid source, the said interconnecting means between the nozzle and the source tank including a flexible extension in said fluid source tank having a filter at its free end and deformable mounting frame members detachably secured to the stub shafts of the said tanks and to a supporting object.

HOWARD H. HURLBERT.

REFERENCES CITED

The following references are of record in the file of this patent:

UNITED STATES PATENTS

| Number | Name | Date |
| --- | --- | --- |
| 912,261 | Perry | Feb. 9, 1909 |
| 1,433,856 | Smith | Oct. 31, 1922 |
| 2,357,141 | Singleton | Aug. 29, 1944 |